US012362111B2

(12) United States Patent
Chen

(10) Patent No.: US 12,362,111 B2
(45) Date of Patent: Jul. 15, 2025

(54) KEYBOARD AND KEY MODULE THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Yi-Wen Chen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 18/426,364

(22) Filed: Jan. 30, 2024

(65) Prior Publication Data

US 2024/0170237 A1 May 23, 2024

Related U.S. Application Data

(63) Continuation of application No. 17/193,775, filed on Mar. 5, 2021, now Pat. No. 11,901,137.
(Continued)

(51) Int. Cl.
*H01H 13/83* (2006.01)
*H01H 3/12* (2006.01)

(52) U.S. Cl.
CPC ............ *H01H 13/83* (2013.01); *H01H 3/122* (2013.01); *H01H 2219/062* (2013.01)

(58) Field of Classification Search
CPC ............ H01H 13/83; H01H 2219/062; H01H 2219/039; H01H 13/023; H01H 2219/06;
(Continued)

(56) References Cited

U.S. PATENT DOCUMENTS 5,408,060 A 4/1995 Muurinen
9,384,916 B1 7/2016 Matsuoka et al.
(Continued)

FOREIGN PATENT DOCUMENTS

CN 106384689 A 2/2017
CN 107180722 A * 9/2017 ............ H01H 13/83

OTHER PUBLICATIONS

Communication corresponding to Chinese Application No. 202110245963.8 and issued by the China National Intellectual Property Administration on Apr. 12, 2022, 16 pages.

*Primary Examiner* — Ahmed M Saeed
(74) *Attorney, Agent, or Firm* — Innovation Counsel LLP

(57) ABSTRACT

A keyboard includes a base plate, a first key module, a second key module, a first light source, a second light source and an insulation layer. The first key module includes a first keycap disposed on the base plate, wherein the first keycap includes a first pattern aligned in a first direction. The second key module includes a second keycap disposed on the base plate, wherein the second keycap includes a second pattern different from the first pattern. The first light source is disposed under the first keycap at a position corresponding to the first pattern. The second light source is disposed under the second keycap at a position corresponding to the second patter. The insulation layer is disposed between the base plate and the first light source, wherein the insulation layer has a third pattern covering the first light source.

20 Claims, 9 Drawing Sheets

Related U.S. Application Data

(60) Provisional application No. 62/985,930, filed on Mar. 6, 2020.

(58) Field of Classification Search
CPC ............... H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS

| | | | |
|---|---|---|---|
| 2008/0130263 | A1 | 6/2008 | Liu et al. |
| 2008/0179172 | A1 | 7/2008 | Sellers |
| 2008/0218371 | A1 | 9/2008 | Joo |
| 2014/0166456 | A1 | 6/2014 | Chen |

* cited by examiner

KEYBOARD AND KEY MODULE THEREOF

This application is a continuation application of co-pending application Ser. No. 17/193,775, filed on Mar. 5, 2021, which claims the benefit of U.S. provisional application Ser. No. 62/985,930, filed on Mar. 6, 2020, the contents of which are incorporated herein by reference.

TECHNICAL FIELD

The disclosure relates in general to a keyboard and a key module thereof.

BACKGROUND

The conventional keyboard includes a plurality of keys that could emit light to illuminate the characters on the keys so that a user could easily recognize (or identify) the keys. However, the keyboard includes a large number of keys, and thus it is difficult to quickly locate the key you are looking for even if the characters are illuminated. Therefore, how to improve the aforementioned problems is an upward trend.

SUMMARY

The present invention is to provide a keyboard and a key module thereof for improving the aforementioned problems.

According to an embodiment, a keyboard is provided. The keyboard includes a base plate, a first key module, a second key module, a first light source, a second light source and an insulation layer. The first key module includes a first keycap disposed on the base plate, wherein the first keycap includes a first pattern aligned in a first direction. The second key module includes a second keycap disposed on the base plate, wherein the second keycap includes a second pattern different from the first pattern. The first light source is disposed under the first keycap at a position corresponding to the first pattern. The second light source is disposed under the second keycap at a position corresponding to the second patter. The insulation layer is disposed between the base plate and the first light source, wherein the insulation layer has a third pattern covering the first light source.

According to another embodiment, a key module is provided. The key module includes a base plate, a keycap, a circuit layer, a circuit board, a light guide medium, a reflective layer, a first light source and a second light source. The base plate with a first side and a second side opposite to the first side. The keycap is disposed on the first side of the base plate. The circuit layer is disposed between the base plate and the keycap. The circuit board is disposed on the second side of the base plate. The light guide medium is disposed between the base plate and the circuit board, wherein the light guide medium is provided with a first opening. The reflective layer is disposed on the circuit board, wherein the reflective layer is provided with a second opening corresponding to the first opening. The first light source is disposed in the first opening. The second light source is disposed in the first opening, wherein the first and second light sources are different.

The above and other aspects of the disclosure will become better understood with regard to the following detailed description of the preferred but non-limiting embodiment (s). The following description is made with reference to the accompanying drawings.

Figure 1A:
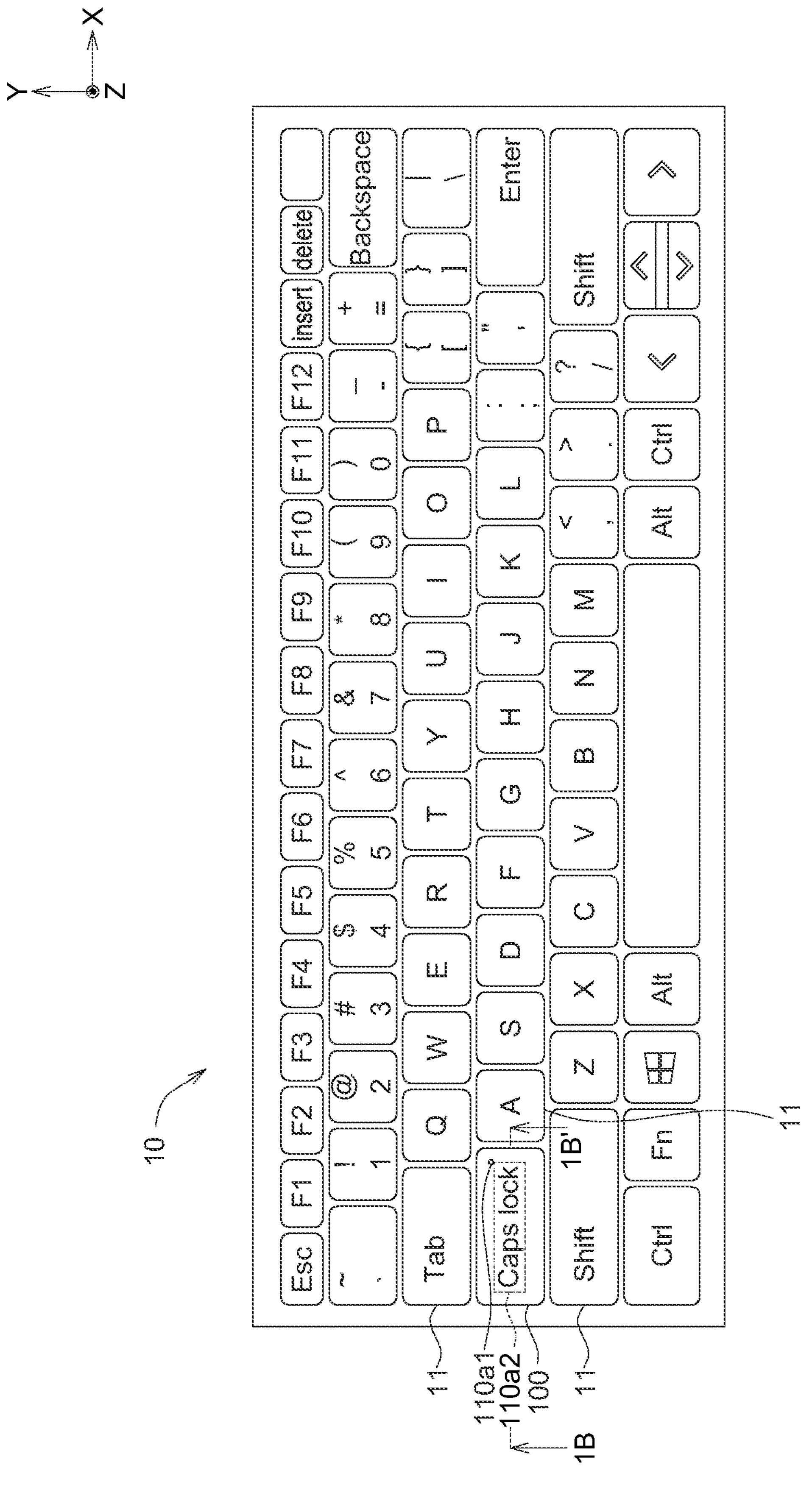
FIG. 1A shows a partial cross-sectional view of the keyboard according to an embodiment of the present invention.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 1B:
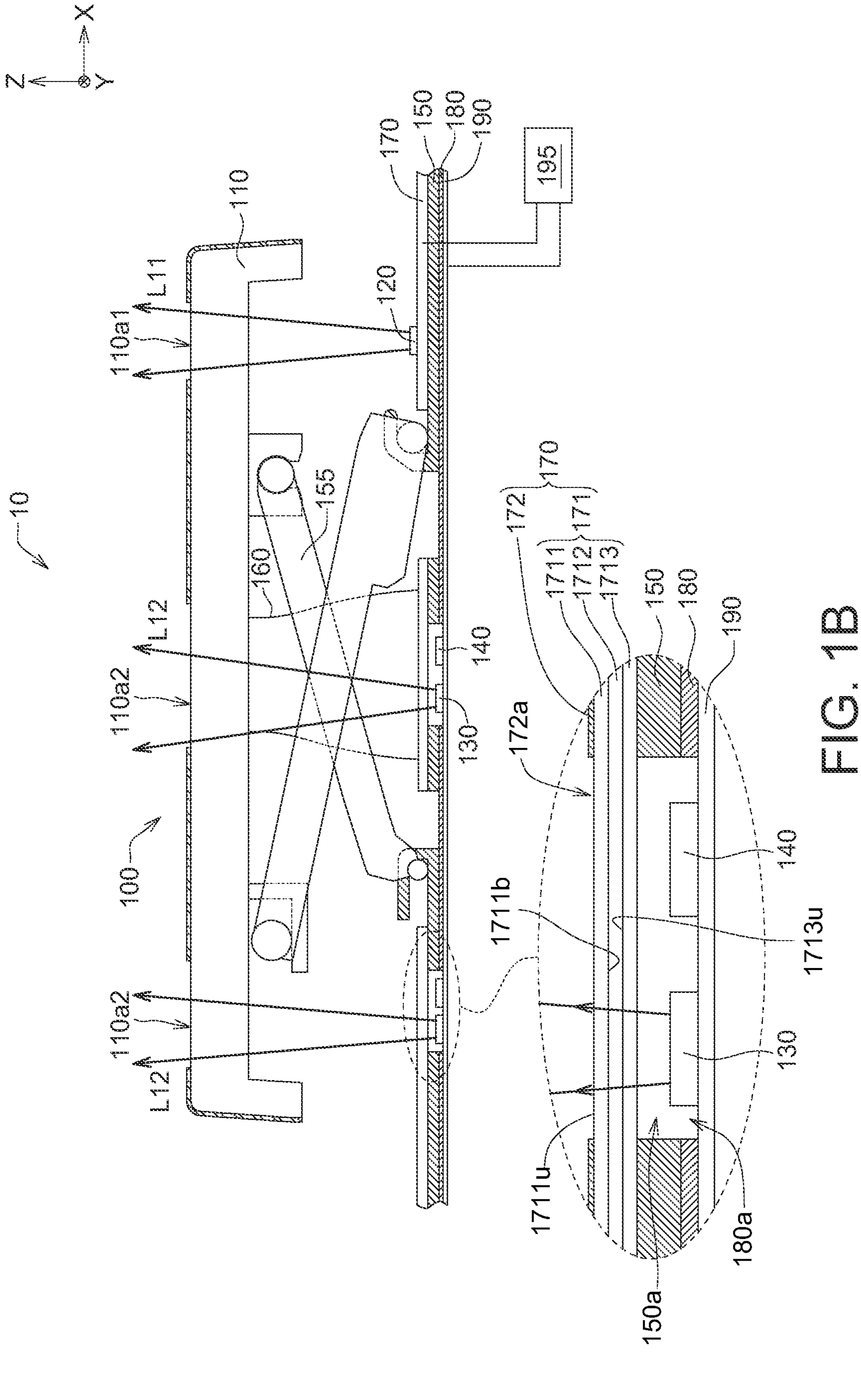
FIG. 1B shows a partial cross-sectional view of the keyboard of FIG. 1A along direction 1B-1B'.
Figure 1C:
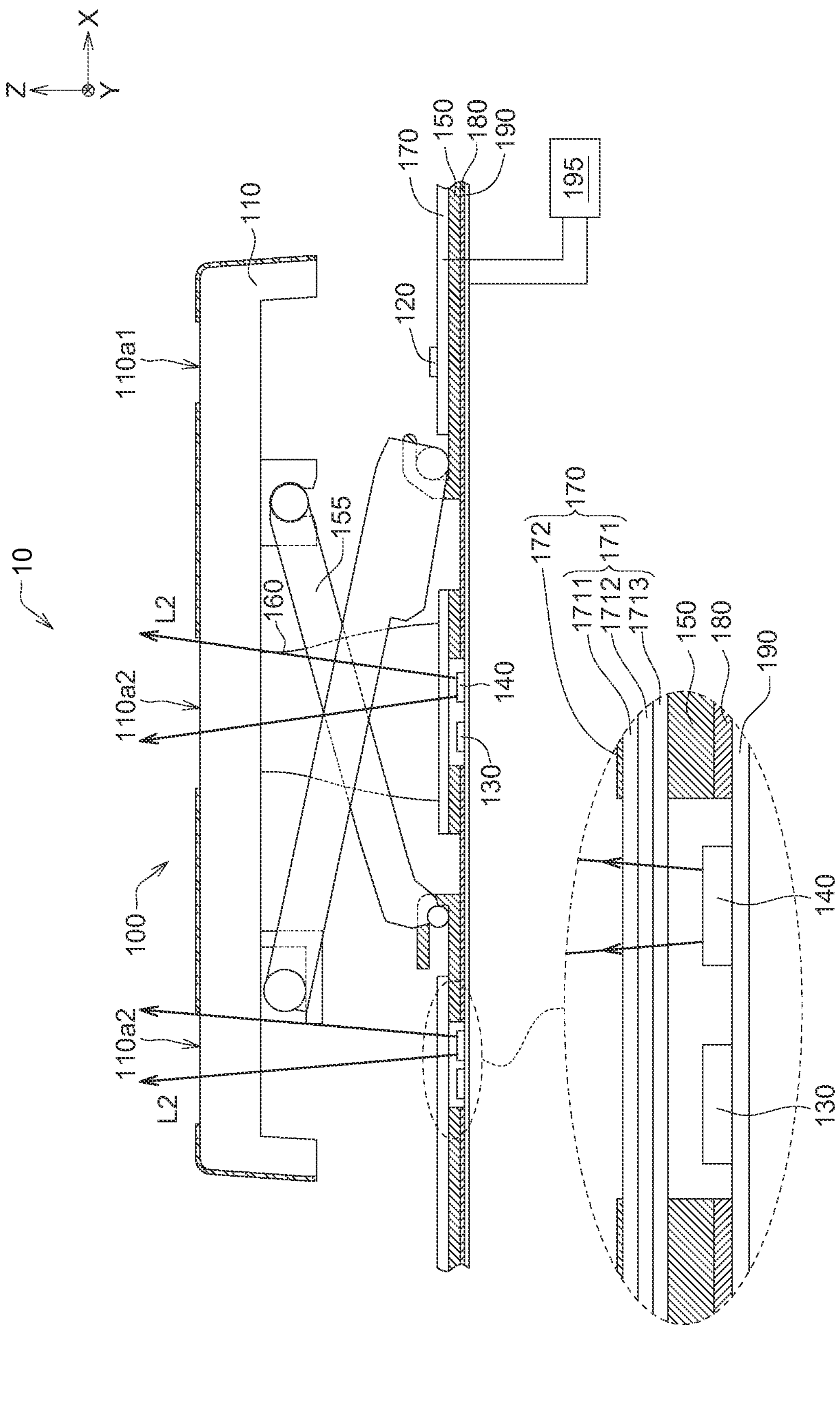
FIG. 1C shows a schematic diagram of a second backlight source of the keyboard emitting second light.

Referring to FIGS. 1A to 1C, FIG. 1A shows a partial cross-sectional view of the keyboard 10 according to an embodiment of the present invention, FIG. 1B shows a partial cross-sectional view of the keyboard 10 of FIG. 1A along direction 1B-1B', and FIG. 1C shows a schematic diagram of a second backlight source 140 of the keyboard 10 emitting second light L2.

The keyboard 10 is, for example, adapted to a notebook computer, a desktop computer, a handheld electronic device (such as a mobile phone) or any electronic device that requires an input interface.

The keyboard 10 includes at least one first key module 100 and at least one second key module 11, and the second key module 11 is disposed adjacent to the first key module 100. The first key module 100 is configured to selectively emit light having one of a first color and a second color, wherein the first color and the second color are different. The second key module 11 is configured to emit light having the second color. As a result, the first key module 100 could emit light of different colors under different conditions, so that the user could recognize (or locate) the first key module 100 more easily, and the visual effect of the first key module 100 could be enhanced.

The second key module 11 is, for example, a character key, but it could have the same structure as that of the first key module 100, and the description is not repeated herein.

In an embodiment, light of the first color is, for example but not limited to, colored light other than white light, such as red light or orange light, and light of the second color is, for example but not limited to, white light. In another embodiment, as long as the first color is different from the second color, light of the first color and the second color could be red light, green light, blue light or a combination light with different proportions thereof. In an embodiment, the first key module 100 could be a toggle key, such as a Caps Lock key; however, such exemplification is not meant to be a limitation to the present disclosure.

As shown in FIG. 1B, the first key module 100 includes a keycap 110, at least one indicator light source 120, at least one first backlight source 130, at least one second backlight source 140, a base plate 150, a lifting mechanism 155, an elastic body 160, a circuit layer 170, an insulation layer 180, a circuit board 190 and a controller 195. In an embodiment, the first key module 100 and the second key module 11 could share at least one of the base plate 150, the circuit layer 170, the insulation layer 180, the circuit board 190, and the controller 195. In another embodiment, at least one of the base plate 150, the circuit layer 170, the insulation layer 180, the circuit board 190 and the controller 195 could not belong to the key module, and it and the key module could be the same level elements of the keyboard 10.

The keycap 110 has an indication area 110*a*1 and a character area 110*a*2. The indicator light source 120 is configured to emit indicating light L11 of the first color toward the indication area 110*a*1. The first backlight source 130 is configured to emit first backlight L12 of the first color toward the character area 110*a*2. The second backlight source 140 is configured to emit the second backlight L2 of the second color toward the character area 110*a*2, and the second color is different from the first color. As a result, the first key module 100 could emit light having different colors under different conditions, so that user could recognize (or locate) the first key module 100 more easily, and the visual effect of the first key module 100 could be enhanced as well.

The indicator light source 120, the first backlight source 130, and/or the second backlight source 140 are, for example, a monochromatic light source or a polychromatic or multicolor light source. For example, the indicator light source 120 could be a dual-color light source, such as a light-emitting element that could emit white light and orange light. When the first backlight source 130 emits white light, the indicator light source 120 also emits white light. When the first backlight source 130 emits orange light, the indicator light source 120 also emits orange light. In addition, the indication area 110*a*1 has a pattern, such as a circle or any pattern displaying a symbol, number, letter or a combination thereof. The character area 110*a*2 could have a pattern including a symbol, number, letter or a combination thereof.

As shown in FIGS. 1B and 1C, in an embodiment, the indicator light source 120, the first backlight source 130, and/or the second backlight source 140 could be controlled by the controller 195 for emitting light or not. For example, the controller 195 is electrically connected to the circuit board 190 and the circuit layer 170 and is configured to: (1) enable the indicator light source 120 to emit the indicating light L11 and enable the first backlight source 130 to emit the first backlight L12 to illuminate the indication area 110*a*1 and the character area 110*a*2, but disable the second backlight source 140 from emitting the second backlight L2, as shown in FIG. 1B; and (2) enable the second backlight source 140 to emit the second backlight L2 to illuminate the character area 110*a*2, but disable the indicator light source 120 from emitting the indicating light L11 and disable the second backlight source 140 from emitting the first backlight L12, as shown in FIG. 1C. In the present embodiment, the indicating light L11 emitted by the indicator light source 120 and the first backlight L12 emitted by the first backlight source 130 could be emitted simultaneously. In addition, the controller 195 could perform the aforementioned setting (1) or (2) according to a switching command (not shown), wherein the switching command could be input by the user, or it could also be automatically performed by the keyboard according to program code.

In addition, the light having the first color (for example, the indicating light L11 and the first backlight L12) and the light having the second color (for example, the second backlight L2) could not be emitted simultaneously. For example, when the first key module 100 is triggered, the controller 195 controls the first key module 100 to emit the indicating light L11 and the first backlight L12 with the first color, but controls the first key module 100 not to emit the second backlight L2 having the second color; when the first key module 100 is triggered again (at a different point of time), the controller 195 controls the first key module 100 to emit the second backlight L2 having the second color, but controls the first key module 100 not to emit the indicating light L11 and the first backlight L12 having the first color.

In addition, the indicator light source 120, the first backlight source 130 and/or the second backlight source 140 could not be controlled by the controller 195. For example, when the first key module 100 is triggered, the indicator light source 120 of the first key module 100 could directly emit the indicating light L11, the first backlight source 130 could directly emit the first backlight L12, and the second backlight source 140 could not emit the second backlight L2, all of which are based on the trigger signal without the controlling of the controller 195. When the first key module 100 is triggered again, the second backlight source 140 of the first key module 100 could directly emit the second backlight L2 according to the trigger signal without the controlling of the controller 195, but the indicating-light element 120 could not emit the indicating light L11 and the first backlight source 130 could not emit the first backlight L12 according to the trigger signal without the controlling of the controller 195.

As shown in FIG. 1B, a light-emitting surface of the indicator light source 120 faces the indication area 110*a*1, so that the emitted indicating light L11 could illuminate the indication area 110*a*1. The light-emitting surfaces of the first backlight source 130 and the second backlight source 140 face the character area 110*a*2, so that the emitted first backlight L12 and second backlight L2 could illuminate the character area 110*a*2.

As shown in FIG. 1B, in the present embodiment, the indicator light source 120 is disposed and electrically connected to the circuit layer 170, and the first backlight source 130 and the second backlight source 140 are disposed on the circuit board 190. The aforementioned controller 195 could control the indicator light source 120 through the circuit layer 170 and control the first backlight source 130 and the second backlight source 140 through the circuit board 190. The circuit board 190 is, for example, a printed circuit board (PCB), a flexible printed circuit (FPC), a thin film circuit board or other types of circuit boards. For the thin film circuit board, although not shown, the thin film circuit board includes a light-transmissive insulation carrier, a patterned circuit layer and a protective film, wherein the light-transmissive insulation carrier is made of a material including, for example, polyethylene terephthalate. (PET), the patterned circuit layer is formed on a light-transmissive insulation carrier, and the patterned circuit layer includes at least one circuit, such as printed conductive ink (for example, silver paste or carbon paste) or metal foil (for example, copper foil). The first backlight source 130 and the second backlight source 140 are electrically connected to the patterned circuit layer. The protective film could cover the patterned circuit layer to protect the patterned circuit layer to avoid, for example, moisture and/or oxidation. In an embodiment, the protective film could further extend to, from the patterned circuit layer, cover the first backlight source 130 and the second backlight source 140. In another embodiment, the protective film could also be integrated into the insulation layer 180; namely, the insulation layer 180 covering at least the patterned circuit layer is used as the protective film to reduce the overall thickness.

As shown in FIG. 1B, the lifting mechanism 155 is movably connected to the keycap 110 and the base plate 150, and could move up and down relative to the base plate 150 to drive the keycap 110 to move up and down therewith. The elastic body 160 is disposed between the keycap 110 and the base plate 150. When the keycap 110 is moved downward (e.g., pressed down), the elastic body 160 deforms to store elastic potential energy. When the keycap 110 is released, the elastic body 160 releases the elastic potential energy to drive the keycap 110 and the lifting mechanism 155 to return to the released position (reset). The circuit layer 170 is disposed on the base plate 150. The circuit layer 170 includes at least one switch (not shown). When the elastic body 160 is deformed (for example, the keycap 110 is pressed), the trigger portion (not shown) of the elastic body 160 triggers a switch of the circuit layer 170, and the triggered switch outputs a trigger signal (not shown) to the controller 195 through the circuit board 190, so that the controller 195 performs corresponding functions accordingly. The lifting mechanism 155 is, for example, a scissor-like mechanism. In addition, the elastic body 160 is made of, for example, rubber, and the lifting mechanism 155 is made of, for example, plastic.

As shown in FIG. 1B, the base plate 150 is disposed under the keycap 110. The base plate 150 has an opening 150*a*, the insulation layer 180 has an opening 180*a*, and the first backlight source 130 and the second backlight source 140 are disposed in the opening 150*a* and the opening 180*a*. The light emitted by the first backlight source 130 and the second backlight source 140 is incident to the keycap 110 through the opening 150*a*. The openings 150*a* and 180*a* are arranged corresponding to the character area 110*a*2, so as to allow the light to be incident toward the character area 110*a*2 through the openings 150*a* and 180*a*. In addition, the insulation layer 180 is, for example, a black or an opaque insulation layer, which could absorb light and prevent light from leaking out of the keyboard 10.

The circuit layer 170 is, for example, a switch membrane layer. The circuit layer 170 and the circuit board 190 are respectively disposed on different sides of the base plate 150, such as two opposite sides of the base plate 150. The circuit layer 170 includes a switch layer 171 and a light-shielding layer 172. The switch layer 171 includes a first insulation layer 1711, a spacer 1712, a second insulation layer 1713 and at least one switch (not shown), wherein the spacer 1712 is disposed between the first insulation layer 1711 and the second insulation layer 1713 to at least partially isolate the first insulation layer 1711 and the second insulation layer 1713. The insulation layer 1711 and the second insulation layer 1713 are, for example, light-transmissive membranes. Although not shown in FIG. 1B, the spacer 1712 could have an opening located right below the trigger portion (not shown) of the elastic body 160, and the switch is located corresponding to the opening and includes a first pad (not shown) and a second pad (not shown) which are respectively disposed on a lower surface 1711*b* of the first layer 1711 and on an upper surface 1713*u* of the second layer 1713. When the trigger portion (not shown) of the elastic body 160 triggers the switch of the circuit layer 170, the first pad and the second pad contact to each other and then output the trigger signal. The light-shielding layer 172 is located on the upper surface 1711*u* of the first insulation layer 1711 and has an opening 172*a*. The opening 172*a* could be arranged at a position corresponding to the character area 110*a*2 to allow light to illuminate on the character area 110*a*2 through the opening 172*a*. In an embodiment, the opening 172*a* could be disposed corresponding to the keycap 110, and the light-shielding layer 172 is, for example, correspondingly disposed between two adjacent keycaps. That is, the light-shielding layer 172 below the keycap 110 could be located outside the edge of the keycap 110 and partially extend inside the edge of the keycap 110, so that the light could illuminate the character area 110*a*2 from the back of the keycap 110 through the opening 172*a*.

Figure 2:
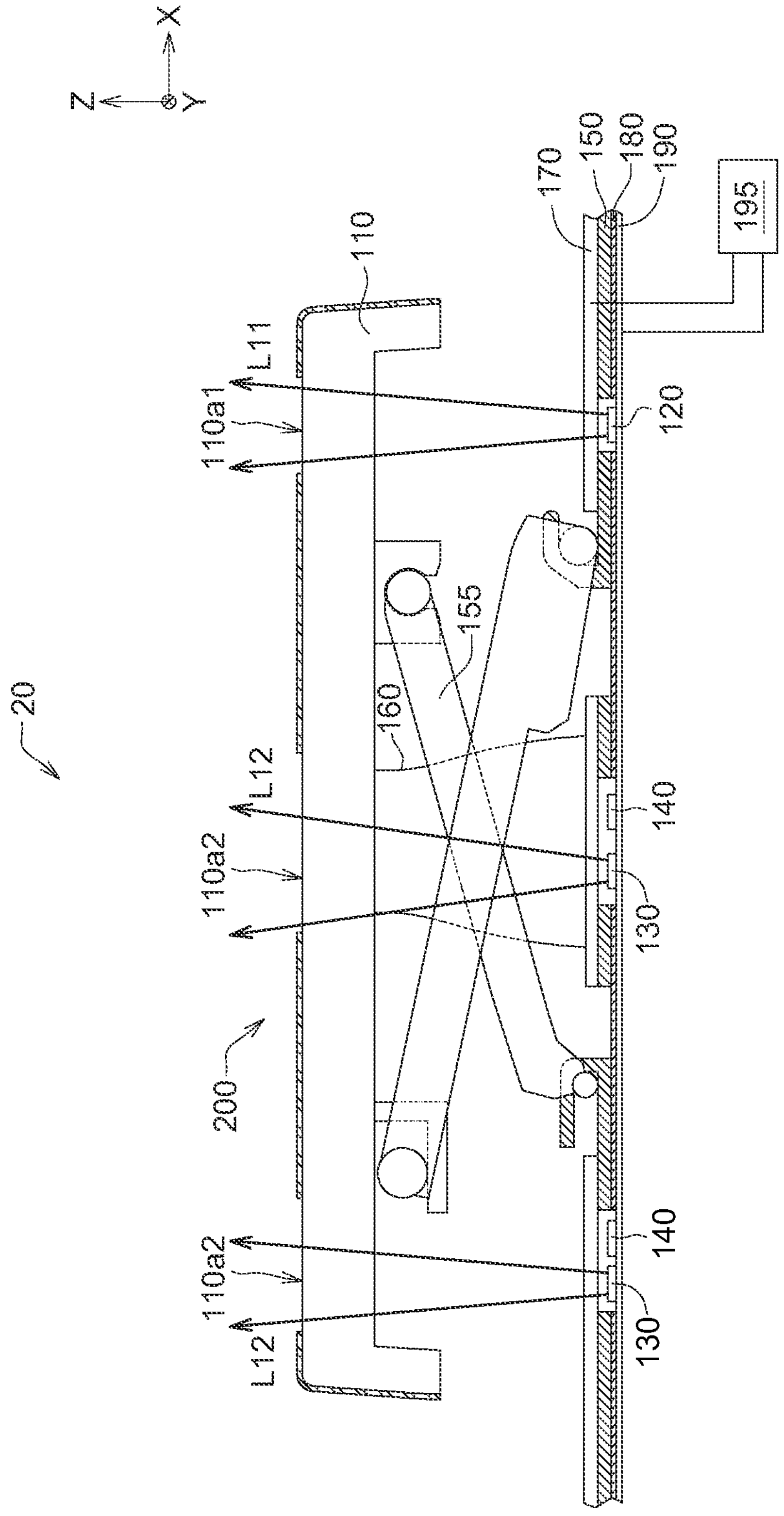
FIG. 2 shows a partial cross-sectional view of a keyboard according to another embodiment of the present invention.

Referring to FIG. 2, FIG. 2 shows a partial cross-sectional view of a keyboard 20 according to another embodiment of the present invention. The keyboard 20 is, for example, adapted to any electronic device, such as a notebook computer, a desktop computer, a handheld electronic device (such as a mobile phone), etc. that requires an input interface. The keyboard 20 includes at least one first key module 200 and at least one second key module 11 (not shown), and the second key module 11 is disposed adjacent to the first key module 200. The first key module 200 is configured to selectively emit light having one of the first color and the second color, and the first color and the second color are different. The second key module 11 is configured to emit light having the second color. As a result, the first key module 200 could emit light having different color under different conditions, so that user could recognize (or locate) the first key module 200 more quickly. In the present embodiment, the first key module 100 is, for example, a Caps Lock key.

The second key module 11 is, for example, a character key, but it could also have the same structure as that of the first key module 200, and the description is not repeated herein.

As shown in FIG. 2, the first key module 200 includes the keycap 110, at least one indicator light source 120, at least one first backlight source 130, at least one second backlight source 140, the base plate 150, the lifting mechanism 155, the elastic body 160, the circuit layer 170, the insulation layer 180, the circuit board 190 and the controller 195. In an embodiment, the first key module 200 and the second key module 11 could share at least one of the base plate 150, the circuit layer 170, the insulation layer 180, the circuit board 190 and the controller 195. In another embodiment, at least one of the base plate 150, the circuit layer 170, the insulation layer 180, the circuit board 190 and the controller 195 could not belong to the key module, and it and the key module could be the same level elements of the keyboard 20.

The first key module 200 of the embodiment of the present invention has the same or similar configuration as that of the first key module 100, except that the indicator light source 120, the first backlight source 130, and the second backlight source 140 of the first key module 200 are all disposed on the circuit board 190.

Figure 3A:
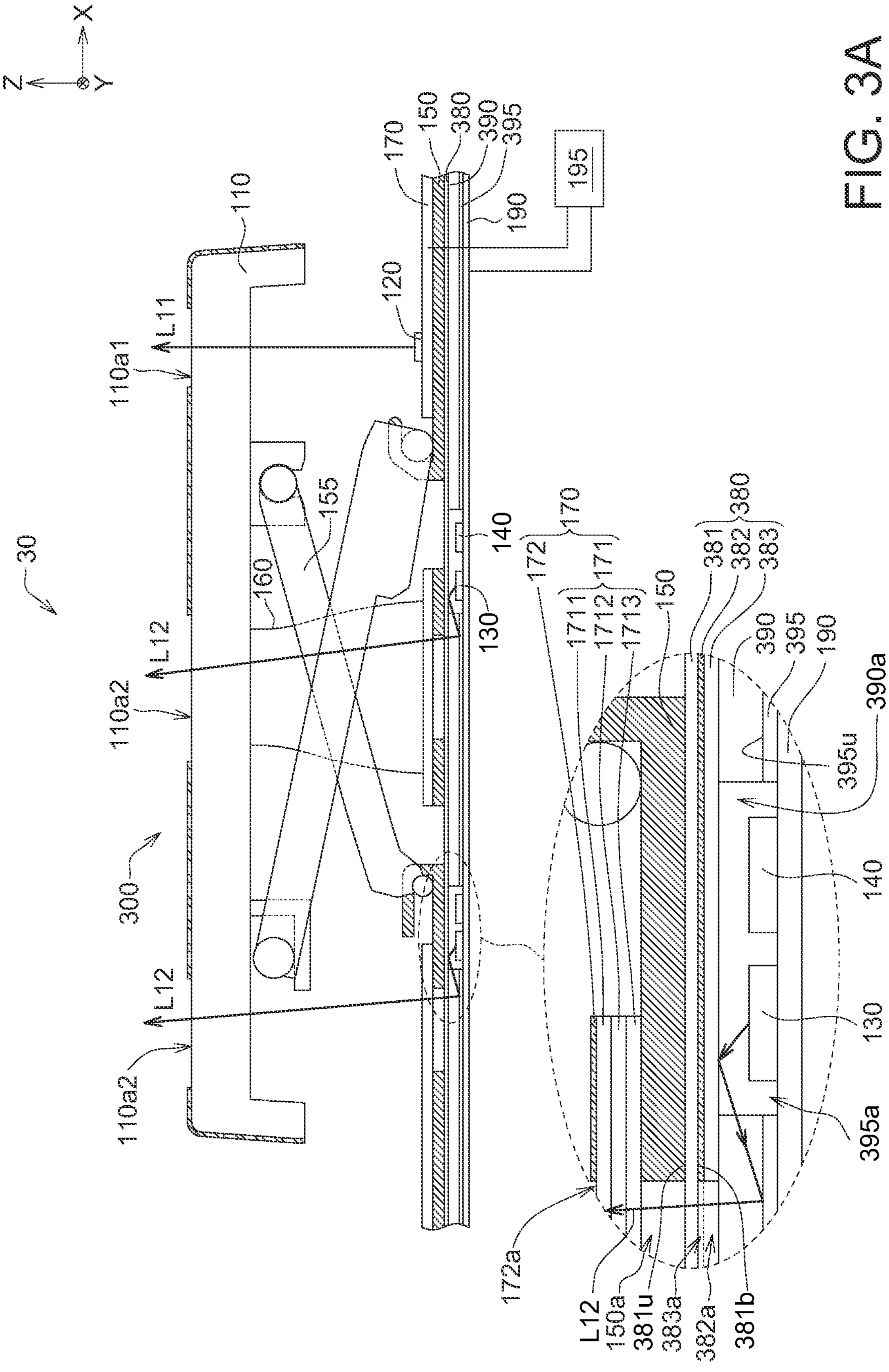
FIG. 3A shows a partial cross-sectional view of a keyboard according to another embodiment of the present invention.
Figure 3B:
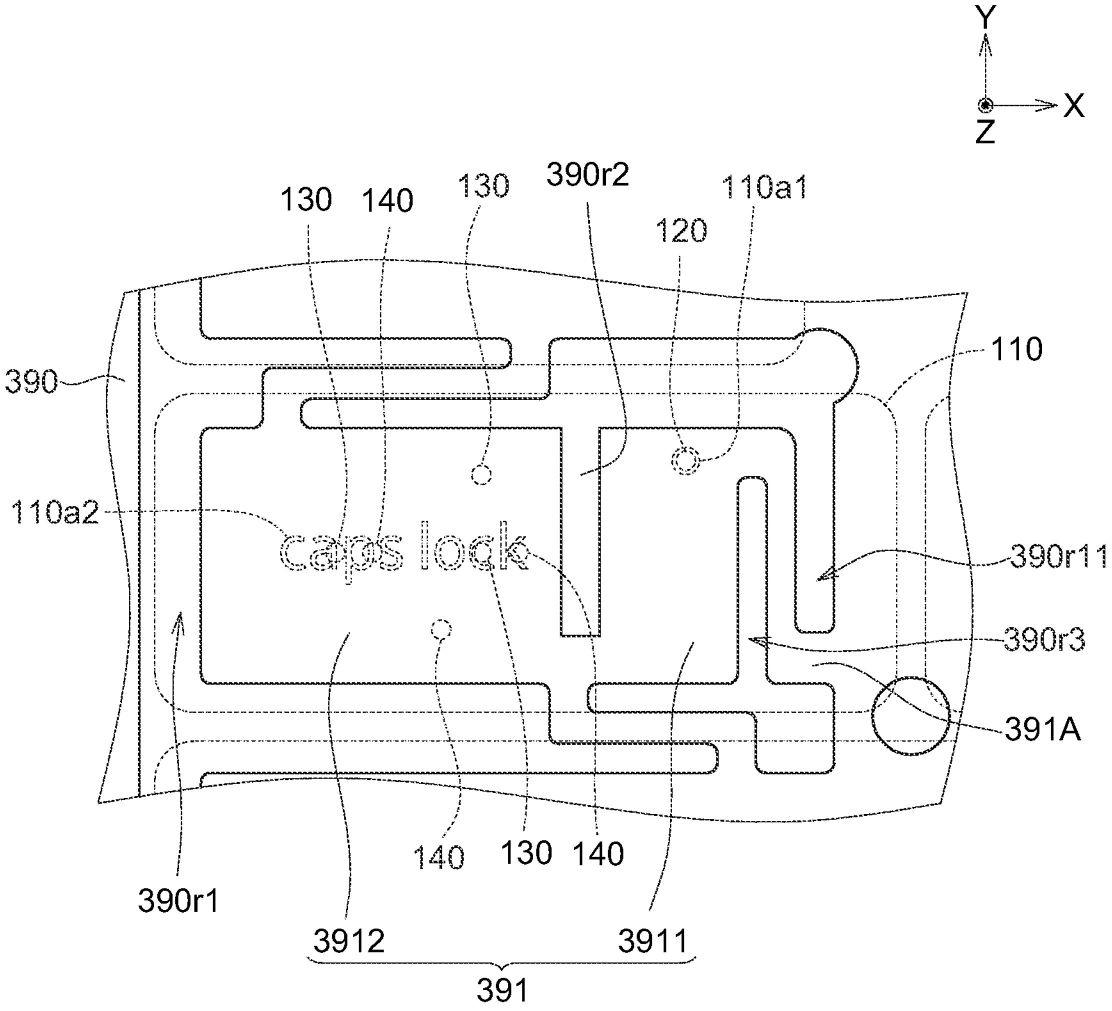
FIG. 3B shows a top view of the light guide plate of the keyboard of FIG. 3A.

Referring to FIGS. 3A and 3B, FIG. 3A shows a partial cross-sectional view of a keyboard 30 according to another embodiment of the present invention, and FIG. 3B shows a top view of the light guide plate 390 of the keyboard 30 of FIG. 3A. The keyboard 30 is, for example, adapted to any electronic device, such as a notebook computer, a desktop computer, a handheld electronic device (such as a mobile phone), etc. that requires an input interface. The keyboard 30 includes at least one first key module 300 and at least one second key module 11 (not shown). The first key module 300 is configured to selectively emit light having one of the first color and the second color, wherein the first color and the second color are different. The second key module 11 is configured to emit light having the second color. As a result, the first key module 300 could emit light having different color under different conditions, so that user could recognize (or locate) the first key module 300 more easily. In the present embodiment, the first key module 100 is, for example, a Caps Lock key.

The second key module 11 is, for example, a character key, but it could also have the same structure as that of the first key module 300, and the description is not repeated herein.

As shown in FIG. 3A, the first key module 300 includes the keycap 110, at least one indicator light source 120, at least one first backlight source 130, at least one second backlight source 140, the base plate 150, the lifting mechanism 155, the elastic body 160, the circuit layer 170, the insulation layer 380, the circuit board 190, a light guide plate 390, a reflective layer 395 and the controller 195. In an embodiment, the first key module 300 and the second key module 11 could share at least one of the base plate 150, the circuit layer 170, the insulation layer 380, the circuit board 190 and the controller 195. In another embodiment, at least one of the base plate 150, the circuit layer 170, the insulation layer 380, the circuit board 190 and the controller 195 could not belong to the key module, and it and the key module could be the same level elements of the keyboard 30.

The first key module 300 of the embodiment of the present invention has the same or similar configuration as that of the first key module 100, except that the first key module 300 further includes the light guide plate 390 and the reflective layer 395.

As shown in FIG. 3A, the insulation layer 380 includes a light-transmissive carrier 381, a light-shielding layer 382, and a reflective layer 383, wherein the reflective layer 383 is closer to the light-emitting element or light source than the light-shielding layer 382 is. In the present embodiment, the light-shielding layer 382 and the reflective layer 383 are disposed on the same side of the light-transmissive carrier 381. For example, the light-shielding layer 382 is formed on a lower surface 381*b* of the light-transmissive carrier 381, and the reflective layer 383 is formed on the light-shielding layer 382, such that the light-shielding layer 382 is disposed between the light-transmissive carrier 381 and the reflective layer 383. In another embodiment, the light-shielding layer 382 could be formed on an upper surface 381*u* of the light-transmissive carrier 381, and the reflective layer 383 is formed on the lower surface 381*b* of the light-transmissive carrier 381. In other embodiments, the reflective layer 383 and the light-shielding layer 382 are laminated on a side of the upper surface 381*u* of the light-transmissive carrier 381, wherein the reflective layer 383 is formed on the upper surface 381*u* of the light-transmissive carrier 381, and the light-shielding layer 382 is formed on the reflective layer 383, such that the reflective layer 383 is located between the light-transmissive carrier 381 and the light-shielding layer 382.

As shown in FIG. 3A, the light-shielding layer 382 has an opening 382*a*, the reflective layer 383 has an opening 383*a*, and the base plate 150 has an opening 150*a*, wherein the openings 382*a*, 383*a* and 150*a* overlap to allow light to travel through the openings 382*a*, 383*a* and 150*a* to be incident to the circuit layer 170. The light-shielding layer 172 of the circuit layer 170 has the opening 172*a* to allow light to be incident to the keycap 110 through the opening 172*a*. The character area 110*a*2 of the keycap 110 corresponds to the openings 383*a*, 382*a*, 150*a*, and 172*a* along the lifting direction of the keycap 110, so that the first backlight L12 or the second backlight L2 could illuminate the character area 110*a*2 through the openings 383*a*, 382*a*, 150*a* and 172*a*.

As shown in FIG. 3A, the light guide plate 390 is disposed under the base plate 150. The light guide plate 390 has an opening 390*a*, the reflective layer 395 has an opening 395*a*, and the first backlight source 130 and the second backlight source 140 are disposed in the openings 390*a* and 395*a*. In addition, the reflective layer 395 has a reflective surface 395*u* for reflecting light back to the light guide plate 390. In an embodiment, the reflective layer 395 could be a single-layer structure or a multi-layer structure. In terms of the single-layer structure, the reflective layer 395 could be doped or added with reflective particles for reflecting light. In terms of the multi-layer structure, the reflective layer 395 could include a light-transmissive substrate (not shown) and a reflective element (not shown), wherein the reflective element is formed on the upper surface of the light-transmissive substrate for reflecting light. The reflective element is, for example, a reflective paint/coating, a reflective sheet, etc.

In the present embodiment, the opening 390*a* corresponds to the character area 110*a*2 along the lifting direction of the keycap 110 (for example, the opening 390*a* faces toward the character area 110*a*2), so that the first backlight L12 emitted by the first backlight source 130 or the second backlight L2 emitted by the second backlight source 140 is directly incident to the character area 110*a*2. However, in another embodiment, the opening 390*a* and the character area 110*a*2 could be partially or completely staggered laterally (e.g., perpendicular to the lifting direction of the keycap 110); in this situation, when the light propagating within the light guide plate 390 is transmitted to the openings 150*a*, 172*a*, 382*a* and 383*a*, the light could illuminate the character area 110*a*2 through these openings.

As shown in FIG. 3B, the area in the dashed frame represents the coverage area of the keycap 110. The light guide plate 390 (the boundary is drawn with thick lines) includes a light guide portion 391 and a first perforation portion 390*r*1. The first perforation portion 390*r*1 is disposed around the light guide portion 391. The light guide portion 391 corresponds to the indicator light source 120, the first backlight source 130 and the second backlight source 140 in position, so that the light emitted by the indicator light source 120, the first backlight source 130 and the second backlight source 140 could be incident to the light guide 391. Due to the first perforation portion 390*r*1 surrounding the light guide portion 391, the light having the second color emitted by the second key module 11 could be blocked or diminished by the first perforation portion 390*r*1, and accordingly it could prevent the light of the second color from affecting the light of the first color emitted by the first key module 300. For example, it could prevent the light emitted by the second key module 11 from being mixed with, in the first key module 300, the light emitted by the first key module 300.

As shown in FIG. 3B, the light guide portion 391 of the light guide plate 390 includes a first light guide portion 3911 and a second light guide portion 3912, and the light guide plate 390 further has at least one second perforation portion 390*r*2. In an embodiment, the second perforation portion 390*r*2 is formed between the first light guide portion 3911 and the second light guide portion 3912. The second perforation portion 390*r*2 could partially separate or completely separate (e.g., completely cut off) the first light guide portion 3911 from the second light guide portion 3912.

The first light guide portion 3911 is disposed corresponding to the indicator light source 120. The second light guide portion 3912 is disposed corresponding to the first backlight source 130. Due to the second perforation portion **390*r*2 separating the first light guide portion 3911 from the second light guide portion 3912, the indicating light L11 emitted by the indicator light source 120 could be prevented from being interfering, through physical material of the light guide plate, with the first backlight L12 emitted by the first backlight source 130. Due to the blocking of the second penetration part 390*r*2, most of the indicating light L11 emitted by the indicator light source 120 could be provided to the indication area 110*a*1, and the first backlight L12 emitted by the first backlight source 130 could be mostly provided to the character area 110*a*2**.

As shown in FIG. 3B, the second perforation portion **390*r*2 extends from the first perforation portion 390*r*1 and passes between the indicator light source 120 and the first backlight source 130 (for example, by connecting the indicator light source 120 and the first backlight source 130), so as to separate the indicator light source 120 from the first backlight source 130**.

In addition, the first perforation portion **390*r*1 could partially surround the light guide portion 391 (for example, the light guide portion 391 is not completely cut off) or completely surround the light guide portion 391 (for example, the light guide portion 391 is cut off and not connected with the remaining portion of the light guide plate 390). In the present embodiment, the first perforation portion 390*r*1 partially surrounds the light guide portion 391, as shown in FIG. 3B, a portion 390*r*11 of the first perforation portion 390*r*1 extends along a first direction (e.g., −Y direction) but does not completely separate the light guide portion 391, so that the light guide portion 391 still retains the connection portion 391A to connect with the light guide portion under the adjacent key module. As a result, it could facilitate more precise alignment and assembly. The light guide plate 390 further has at least one third perforation portion 390*r*3, wherein the third perforation portion 390*r*3 extends from the first perforation portion 390*r*1 in a second direction (e.g., +Y direction) and is staggered with the portion 390*r*11 along a third direction (e.g., X direction). As a result, the third perforation portion 390*r*3 could block the light from being transmitted, through the connection portion 391A, to the light guide portion of the adjacent key module, and accordingly it could reduce the light (emitted by the indicator light source 120, the first backlight source 130 and/or the second backlight source 140) transmitted to the adjacent key module, or even to prevent the light emitted by the indicator light source 120, the first backlight source 130 and/or the second backlight source 140** from being transmitted to the adjacent key module.

Figure 4:
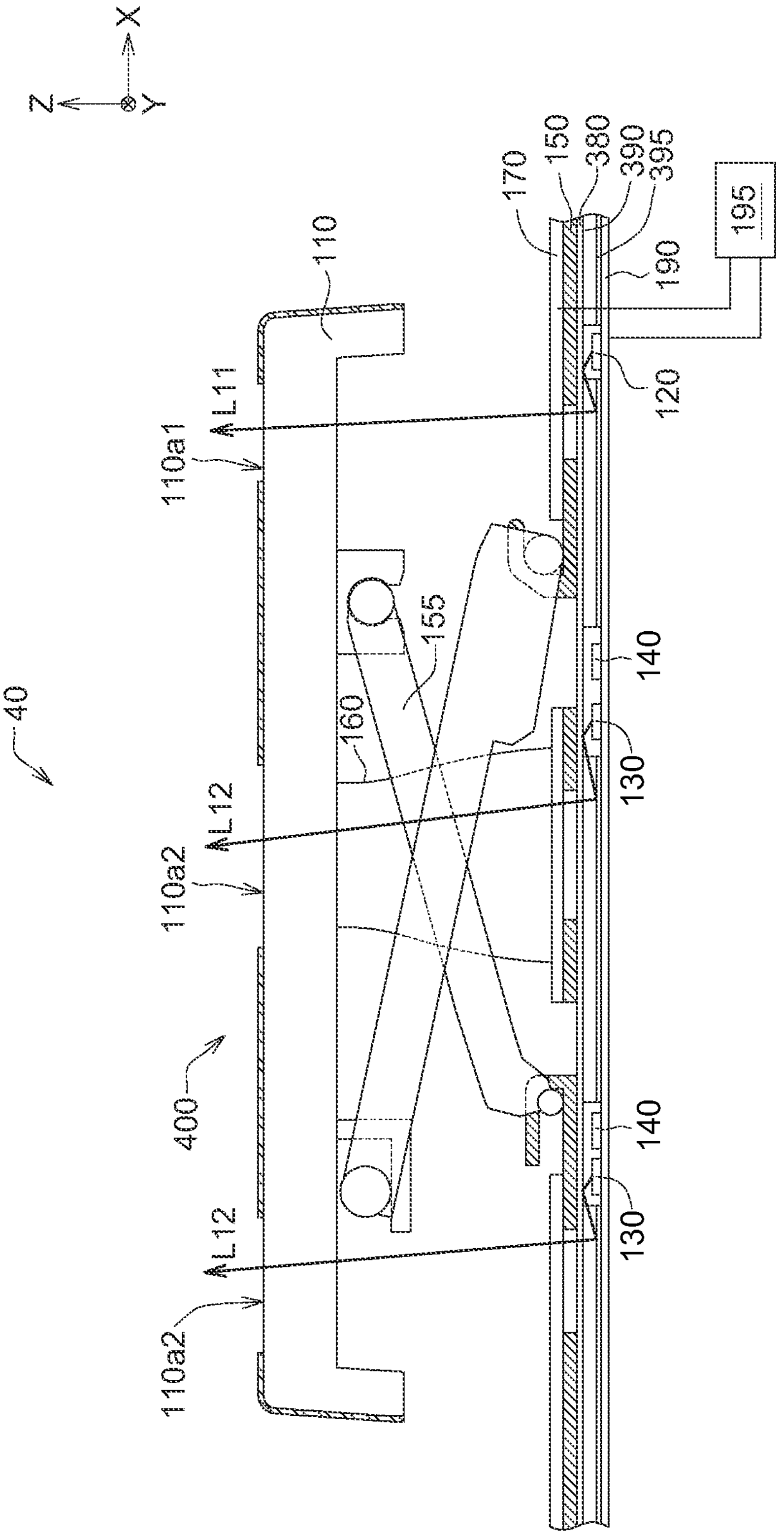
FIG. 4 shows a partial cross-sectional view of a keyboard according to another embodiment of the present invention.

Referring to FIG. 4, FIG. 4 shows a partial cross-sectional view of a keyboard 40 according to another embodiment of the present invention. The keyboard 40 is, for example, adapted to any electronic device, such as a notebook computer, a desktop computer, a handheld electronic device (such as a mobile phone), etc. that requires an input interface. The keyboard 40 includes at least one first key module 400 and at least one second key module 11 (not shown), and the second key module 11 is disposed adjacent to the first key module 400. The first key module 400 is configured to selectively emit light having one of the first color and the second color, wherein the first color and the second color are different. The second key module 11 is configured to emit light having the second color. As a result, the first key module 400 could emit light having different color under different conditions, so that user could recognize (or locate) the first key module 400 more easily. In the present embodiment, the first key module 400 is, for example, a Caps Lock key.

The second key module 11 is, for example, a character key, but it could also have the same structure as that of the first key module 400, and the description is not repeated herein.

As shown in FIG. 4, the first key module 400 includes the keycap 110, at least one indicator light source 120, at least one first backlight source 130, at least one second backlight source 140, the base plate 150, the lifting mechanism 155, the elastic body 160, the circuit layer 170, the insulation layer 380, the circuit board 190, the light guide plate 390, the reflective layer 395 and the controller 195. In the present embodiment, the first key module 400 and the second key module 11 could share at least one of the base plate 150, the circuit layer 170, the insulation layer 380, the circuit board 190 and the controller 195. In another embodiment, at least one of the base plate 150, the circuit layer 170, the insulation layer 380, the circuit board 190 and the controller 195 could not belong to the key module, and it and the key module could be the same level elements of the keyboard 40.

The first key module 400 of the embodiment of the present invention has the same or similar configuration as that of the first key module 300, except that the indicator light source 120, the first backlight source 130 and second backlight source 140 of the first key module 400 are all disposed on the circuit board 190.

Figure 5:
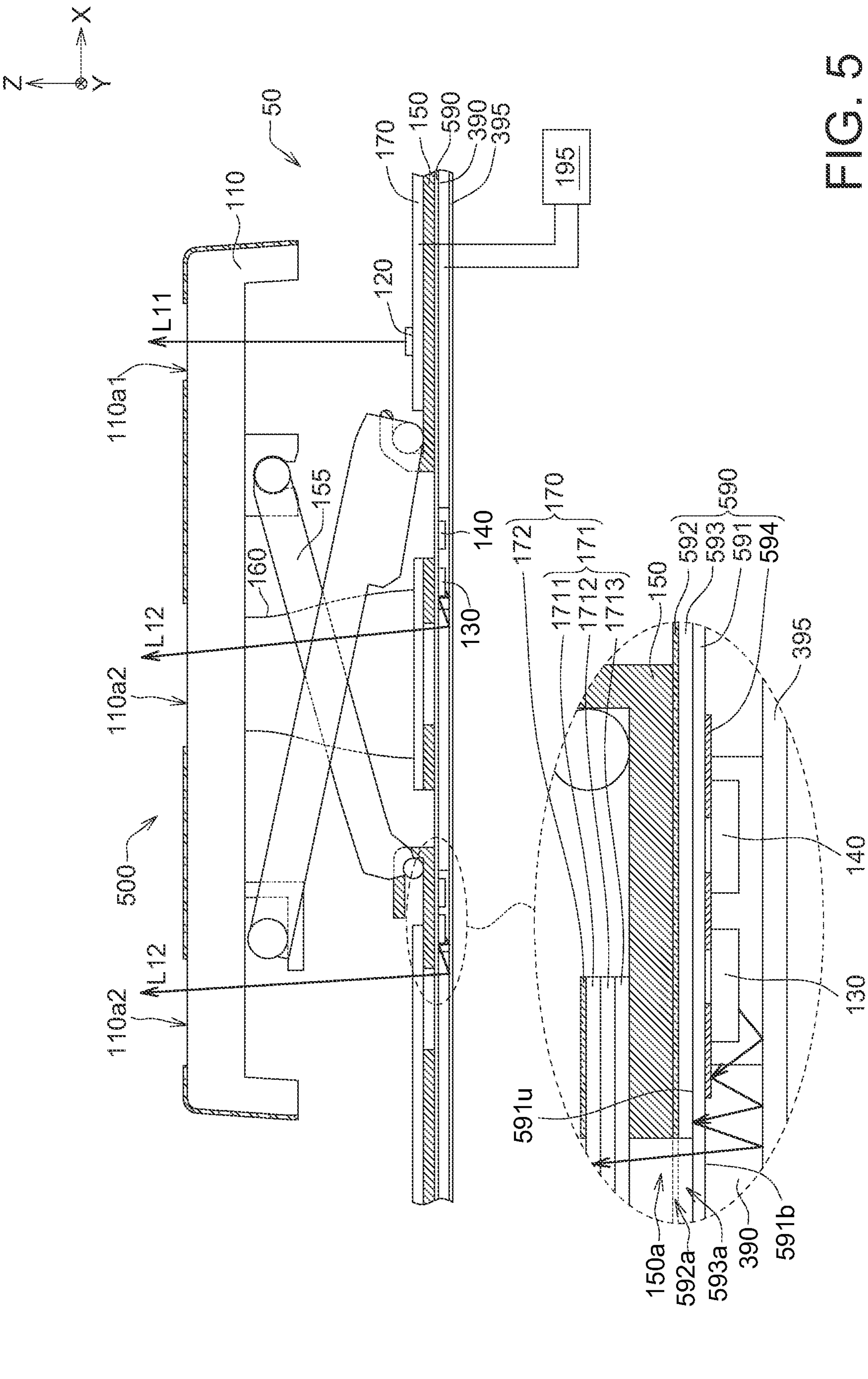
FIG. 5 shows a partial cross-sectional view of a keyboard according to another embodiment of the present invention.

Referring to FIG. 5, FIG. 5 shows a partial cross-sectional view of a keyboard 50 according to another embodiment of the present invention. The keyboard 50 is, for example, adapted to any electronic device, such as a notebook computer, a desktop computer, a handheld electronic device (such as a mobile phone), etc. that requires an input interface. The keyboard 50 includes at least one first key module 500 and at least one second key module 11 (not shown), and the second key module 11 is disposed adjacent to the first key module 500. The first key module 500 is configured to selectively emit light having one of the first color and the second color, wherein the first color and the second color are different. The second key module 11 is configured to emit light having the second color. As a result, the first key module 500 could emit light having different color under different conditions, so that user could recognize (or locate) the first key module 500 more easily. In the present embodiment, the first key module 500 is, for example, a Caps Lock key.

The second key module 11 is, for example, a character key, but it could also have the same structure as that of the first key module 500, and the description is not repeated herein.

As shown in FIG. 5, the first key module 500 includes the keycap 110, at least one indicator light source 120, at least one first backlight source 130, at least one second backlight source 140, the base plate 150, the lifting mechanism 155, the elastic body 160, the circuit layer 170, the light guide plate 390, the reflective layer 395, the circuit board 590 and the controller 195. In the present embodiment, the first key module 500 and the second key module 11 could share at least one of the base plate 150, the circuit layer 170, the circuit board 590 and the controller 195. In another embodiment, at least one of the base plate 150, the circuit layer 170 the circuit board 590 and the controller 195 could not belong to the key module, and it and the key module could be the same level elements of the keyboard 50.

The first key module 500 of the present embodiment of the present invention has the same or similar configuration as that of the first key module 400, except that the structure of the circuit board 590 of the first key module 500 is different from that of the circuit board 190 of the first key module 400.

As shown in FIG. 5, the circuit board 590 includes a light-transmissive carrier 591, a light-shielding layer 592, a reflective layer 593 and a patterned circuit layer 594. The reflective layer 593 is closer to the light-emitting element than the light-shielding layer 592 is. In the present embodiment, the light-shielding layer 592 and the reflective layer 593 are formed on the same side of the light-transmissive carrier 591. For example, the reflective layer 593 is formed on an upper surface 591*u* of the light-transmissive carrier 591, and the light-shielding layer 592 is formed on the reflective layer 593. In another embodiment, the light-shielding layer 592 could be formed on the upper surface 591*u* of the light-transmissive carrier 591, and the reflective layer 592 is formed on a lower surface 591*b* of the light-transmissive carrier 591. In other embodiments, the light-shielding layer 592 is formed on the lower surface 591*b* of the light-transmissive carrier 591, and the reflective layer 593 is formed on the light-shielding layer 592. The light-shielding layer 592 has an opening 592*a*, and the reflective layer 593 has an opening 593*a* to allow light to be incident to the circuit layer 170 through the openings 592*a* and 593*a* and the opening 150*a* of the base plate 150.

As shown in FIG. 5, the first backlight source 130 and the second backlight source 140 are disposed on the circuit board 590 and are electrically connected to the patterned circuit layer 594. The light-emitting surfaces of the first backlight source 130 and the second backlight source 140 face the reflective layer 395, so that the light emitted by the first backlight source 130 and the second backlight source 140 is incident to the reflective layer 395 and then is reflected to the light guide plate 390 or the opening 150*a* of the base plate 150 by the reflective layer 395, and is incident to the keycap 110 through the opening 150*a*.

Figure 6:
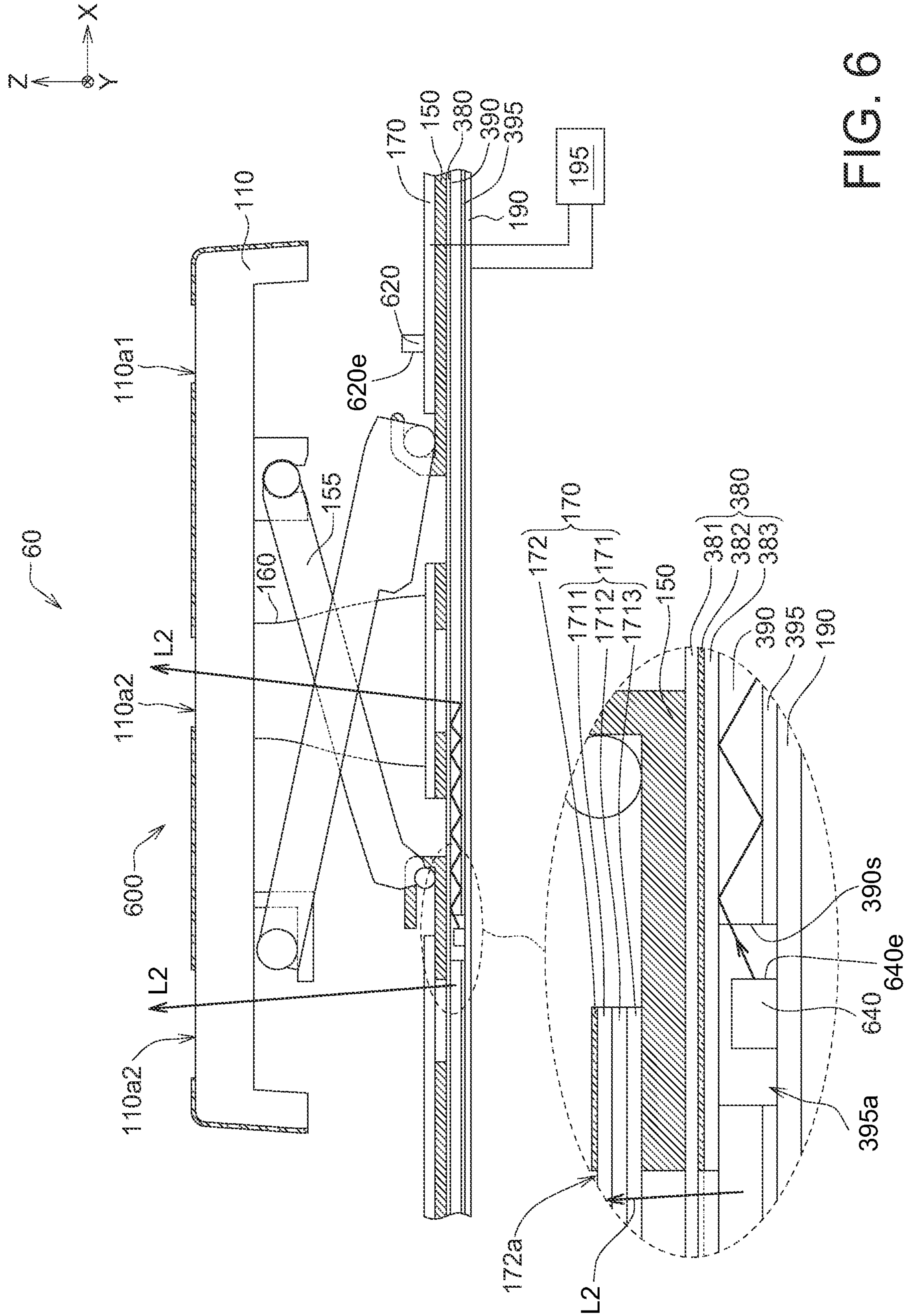
FIG. 6 shows a partial cross-sectional view of a keyboard according to another embodiment of the present invention.

Referring to FIG. 6, FIG. 6 shows a partial cross-sectional view of a keyboard 60 according to another embodiment of the present invention. The keyboard 60 is, for example, adapted to any electronic device, such as a notebook computer, a desktop computer, a handheld electronic device (such as a mobile phone), etc. that requires an input interface.

The keyboard 60 includes at least one first key module 600 and at least one second key module 11 (not shown). The first key module 600 is configured to selectively emit light having one of the first color and the second color, wherein the first color and the second color are different. The second key module 11 is configured to emit light having the second color. As a result, the first key module 600 could emit light having different color under different conditions, so that user could recognize (or locate) the first key module 600 more easily. In the present embodiment, the first key module 600 is, for example, a Caps Lock key.

The second key module 11 is, for example, a character key, but it could also have the same structure as that of the first key module 600, and the description is not repeated herein.

As shown in FIG. 6, the first key module 600 includes the keycap 110, at least one indicator light source 620, at least one backlight source 640, the base plate 150, the lifting mechanism 155, the elastic body 660, the circuit layer 170, the insulation layer 380, the circuit board 190, the light guide plate 390, the reflective layer 395 and the controller 195. In an embodiment, the first key module 500 and the second key module 11 could share at least one of the base plate 150, the circuit layer 170, the circuit board 190, the insulation layer 380 and the controller 195. In another embodiment, at least one of the base plate 150, the circuit layer 170, the circuit board 190, the insulation layer 380 and the controller 195 could not belong to the key module, and it and the key module could be the same level elements of the keyboard 60.

The first key module 600 of the embodiment of the present invention has the same or similar configuration as that of the first key module 300, except that the indicator light source 620 and the backlight source 640 of the first key module 600 are side-light emitting elements, and the light emitted by the indicator light source 620 could be transmitted to the keycap 110 through the elastic body 660.

The indicator light source 620 has a light-emitting surface 620*e* facing a lateral side of the elastic body 660. The indicator light source 620 could emit the indicating light L11 (not shown) having the first color. The indicating light L11 could be transmitted to the keycap 110 through the elastic body 660, and then transmitted to the indication area 110*a*1 and the character area 110*a*2 through the keycap 110 for emitting light. The backlight source 640 has a light-emitting surface 640*e* facing a lateral side 390*s* of the light guide plate 390. The backlight source 640 could emit the backlight L2, and the backlight L2 having the second color. The backlight L2 is transmitted within the light guide plate 390, is Incident on the keycap 110 through the opening of the insulation layer 380 and the opening of the base plate 150 and is emitted out of the character area 110*a*2.

In an embodiment, the controller 195 is configured to: (1). as shown in FIG. 6, enable the backlight source 640 to emit the backlight L2 to illuminate the character area 110*a*2, but disable the indicator light source 620 from emitting the indicating light L11; and (2). enable the indicator light source 620 to emit the indicating light L11 to illuminate the character area 110*a*2 and the indication area 110*a*1. In the aforementioned setting (2), the controller 195 could enable to emit the backlight L2 or disable the backlight source 640 from emitting the backlight L2. When the indicator light source 620 and the backlight source 640 emit light simultaneously, the light emitted from the character area 110*a*2 and the indication area 110*a*1 is mixed light of the indicating light L11 with the backlight L2.

In addition, the controller 195 could execute the aforementioned setting (1) or (2) according to a switching command (not shown), the switching command is input by the user, for example.

The foregoing embodiment uses the indicator light source 620 as a side-view light source to illuminate the indication area 110*a*1 and the character area 110*a*2 as an example for description. However, in other embodiments, the indicator light source 620 could also be used as a top-view light source. The indicator light source 620 could be a polychromatic or multicolor light source, such as a light-emitting element that could emit two different colors, and has the light-emitting surface 620*e* facing the indication area 110*a*1. For example, the indicator light source 620 is a light-emitting element that could emit white light and orange light. When the backlight source 640 emits white light out of the character area 110*a*2, the indicator light source 620 could emit white light or orange light out of the indication area 110*a*1 according to the switching command to facilitate the user to recognize the switching of different functions.

In summary, the keyboard of the embodiment of the present invention includes at least one first key module and at least one second key module, and the second key module is disposed adjacent to the first key module. The first key module could switch or change the color of the emitted light at different points of time (for example, twice triggers), and thus it could be recognized (or distinguished) from the color of the light emitted by the adjacent second key module. As a result, it allows the user to recognize (or locate) the first key module more easily, and the visual effect of the first key module could also be increased.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A keyboard, comprising:

a base plate;

a first key module comprising a first keycap disposed on the base plate, wherein the first keycap comprises a first pattern aligned in a first direction;

a second key module comprising a second keycap disposed on the base plate, wherein the second keycap comprises a second pattern different from the first pattern;

a first light source, disposed under the first keycap at a position corresponding to the first pattern;

a second light source, disposed under the second keycap at a position corresponding to the second pattern; and an insulation layer, disposed between the base plate and the first light source, wherein the insulation layer has a third pattern covering the first light source.

2. The keyboard according to claim 1, further comprising:

a third light source, disposed under the first keycap at a position corresponding to the first pattern and positioned side by side with the first light source; and a fourth light source, disposed under the second keycap at a position corresponding to the second pattern and positioned side by side with the second light source, wherein the first and third light sources are different, and the second and fourth light sources are different.

3. The keyboard according to claim 2, wherein the first and third light sources are arranged parallel to the first direction.

4. The keyboard according to claim 2, wherein the insulation layer comprises:

a light-shielding layer; and a reflective layer disposed between the light-shielding layer and the first light source, wherein a portion of the reflective layer overlapping the light-shielding layer covers the first and third light sources.

5. The keyboard according to claim 4, wherein an opening of the base plate overlaps an opening of the light-shielding layer covering an opening of the reflective layer.

6. The keyboard according to claim 2, further comprising:

a circuit board, disposed on a side of the base plate opposite to the first and second keycaps; and a light guide medium, disposed between the base plate and the circuit board, wherein the first and third light sources are electrically connected to the circuit board at a position corresponding to a first opening of the light guide medium.

7. The keyboard according to claim 6, further comprising a reflective layer disposed between the light guide medium and the circuit board, wherein the reflective layer is provided with a second opening corresponding to the first and third light sources.

8. The keyboard according to claim 1, further comprising a light guide medium disposed on a side of the base plate opposite to the first and second keycaps, wherein the light guide medium comprises:

a first light guide portion corresponding to the first light source;

a second light guide portion corresponding to the second light source; and a perforation portion disposed between the first light guide portion and the second light guide portion and corresponding to an edge of the first keycap.

9. The keyboard according to claim 1, wherein the first light source is a polychromatic or multicolor light source.

10. The keyboard according to claim 1, wherein the insulation layer has an opening corresponding to an opening of the base plate.

11. The keyboard according to claim 1, further comprising:

a third light source, disposed under the first keycap at a position corresponding to the first pattern and adjacent to the first light source; and wherein the first and third light sources are different, and the third pattern overlaps the first and third light sources.

12. A key module, comprising:

a base plate with a first side and a second side opposite to the first side;

a keycap, disposed on the first side of the base plate;

a circuit layer, disposed between the base plate and the keycap;

a circuit board, disposed on the second side of the base plate;

a light guide medium, disposed between the base plate and the circuit board, wherein the light guide medium is provided with a first opening;

a reflective layer, disposed on the circuit board, wherein the reflective layer is provided with a second opening corresponding to the first opening;

a first light source, disposed in the first opening; and a second light source, disposed in the first opening, wherein the first and second light sources are different;

wherein the light guide medium comprises:

a first light guide portion corresponding to the first and second light sources;

a second light guide portion corresponding to another light source; and a perforation portion disposed between the first light guide portion and the second light guide portion.

13. The key module according to claim 12, wherein a portion of the first opening overlaps the second opening, and the first and second light sources are disposed in the first and second openings.

14. The key module according to claim 12, further comprising:

a linking element, disposed between the keycap and the base plate, wherein the first opening is covered by the linking element.

15. The key module according to claim 12, further comprising:

an insulation layer, being disposed on the second side of the base plate, and covering a patterned circuit layer of the circuit board, wherein the insulation layer is provided with a third opening arranged corresponding an aperture of the base plate.

16. The key module according to claim 12, wherein the perforation portion is disposed at a position corresponding to an edge of the keycap.

17. The key module according to claim 12, wherein a part of the perforation portion extends in a direction perpendicular to a lengthwise of the keycap.

18. The key module according to claim 12, wherein the first light source and the second light source are in parallel alignment.

19. The key module according to claim 12, wherein the first and second light sources different in color are disposed under a single character or symbol of the keycap.

20. The key module according to claim 12, further comprising:

an insulation layer disposed between the base plate and the circuit board;

wherein the insulation layer is provided with a pattern at the positions corresponding to the first light source and the second light source.

* * * * *